United States Patent [19]

Knapp

[11] 4,189,921
[45] Feb. 26, 1980

[54] HYDRAULIC CONTROLLER

[75] Inventor: Kenneth K. Knapp, Spencer, Iowa

[73] Assignee: Eaton Corporation, Cleveland, Ohio

[21] Appl. No.: 14,171

[22] Filed: Feb. 22, 1979

Related U.S. Application Data

[63] Continuation-in-part of Ser. No. 801,884, May 31, 1977, abandoned, which is a continuation-in-part of Ser. No. 701,790, Jul. 2, 1976, abandoned.

[51] Int. Cl.² ............................................. F16H 39/46
[52] U.S. Cl. ............................................ 60/445; 60/452; 60/488
[58] Field of Search ................. 60/389, 390, 391, 431, 60/445, 451, 452, 465, 487, 488

[56] References Cited

U.S. PATENT DOCUMENTS

| | | | |
|---|---|---|---|
| 2,516,662 | 7/1950 | Vickers et al. | 60/444 X |
| 2,976,685 | 3/1961 | Thomas et al. | 60/431 |
| 3,152,445 | 10/1964 | Weisenbach | 60/389 |
| 3,166,891 | 1/1965 | Weisenbach | 60/389 |
| 3,411,297 | 11/1968 | Hann | 60/389 |

FOREIGN PATENT DOCUMENTS

| | | | |
|---|---|---|---|
| 990054 | 4/1965 | United Kingdom | 60/445 |
| 1008089 | 10/1965 | United Kingdom | 60/445 |
| 1287630 | 9/1972 | United Kingdom | 60/445 |
| 1369717 | 10/1974 | United Kingdom | 60/445 |
| 1395189 | 5/1975 | United Kingdom | 60/490 |
| 1395190 | 5/1975 | United Kingdom | 60/445 |

Primary Examiner—Edgar W. Geoghegan
Attorney, Agent, or Firm—R. J. McCloskey; J. Yakimow; L. Kasper

[57] ABSTRACT

A hydraulic controller for a hydrostatic transmission to control a number of functions of a variable displacement pump or motor of the transmission. A valve includes a spool biased in one direction by a spring and in the opposite direction by fluid pressure in a chamber communicating with the charge pump. A variable orifice communicates the chamber with a drain. The size of the orifice is controlled electrically by a signal representative of swashplate position. Depending upon the pressure of the fluid in the chamber, the valve will directly vary the pressure ported from the charge pump to the standard controller. A needle roller has one end in contact with the end of the spool communicating with the chamber. A high pressure signal is provided via a shuttle valve across the high and low pressure conduits of the transmission to the other end of the needle roller. The control valve is thereby responsive to both pump displacement and the highest pressure within the transmission thereby making it a torque limiting controller. Various other modifications are described.

35 Claims, 20 Drawing Figures

HYDRAULIC CONTROLLER

CROSS REFERENCE TO RELATED APPLICATIONS

This application is a continuation-in-part of U.S. application Ser. No. 801,884, filed May 31, 1977, now abandoned, which is a continuation-in-part of U.S. application Ser. No. 701,790, filed July 2, 1976, now abandoned.

The present invention relates to a hydraulic control for varying the control pressure to a variable control valve used to port fluid to the servos of a variable displacement pump or motor.

It is common in designing controls for hydrostatic transmissions to design a distinct control for each desired function. For example, a pressure override (P.O.R.) control is designed to monitor the high pressure of a transmission to protect the transmission from extended excessive overloads. P.O.R. controls are well known in the art and will be disclosed, in part, in the present application. Further, an anti-stall control is used to destroke the swashplate of a pump in response to loading of the prime mover of the pump. Anti-stall controls generally make use of governors (see U.S. Pat. Nos. 2,516,662 and 2,976,685) to directly control movement of a valve spool and thereby control fluid pressure. Another type of control is a phasing control which is used to first increase the displacement of the swashplate of a pump in a hydrostatic transmission to its maximum and then decrease the displacement of the swashplate motor to a minimum during an increase in speed of the transmission and to reverse such process during a decrease in speed. Phasing controls generally make use of cams (see U.S. Pat. No. 2,516,662). Yet a further control is an input torque limiter (I.T.L.) control which matches the torque of a hydrostatic transmission to that of the prime mover. I.T.L. controls generally make use of cams to reset the compensating override pressure for each swashplate position to maintain a constant value of system pressure times pump displacement. Other known I.T.L. controls are hydraulic wherein a pressure drop across a compensating or override spool is maintained proportional to the pump displacement. This is generally accomplished by a variable orifice. Further, other known I.T.L. controls are electrical. In the electrical I.T.L. controls the displacement of the pump and the system pressure are each measured and then multiplied to produce a signal which is then used to control the displacement of the pump. All of the electrical I.T.L. controls which applicant is aware of make use of a pressure transducer.

Although each of the preceding referenced controls perform their respective functions satisfactorily, they are relatively cumbersome, complicated, difficult to adjust, and expensive. Further, a separate, distinct control exists for each of the functions. Generally, the parts of each of the controls cannot be interchanged with parts from another control.

Accordingly, it is an object of the present invention to provide a simple, inexpensive control which may be readily adapted to perform a number of functions in controlling the operation of a variable displacement pump, a variable displacement motor, or a hydrostatic transmission including a pump and motor combination.

It is a further object of the present invention to provide a basic component which may be simply and easily adapted to control any one of a number of functions of either a hydrostatic transmission or the pump or motor of the transmission.

Figure 4:
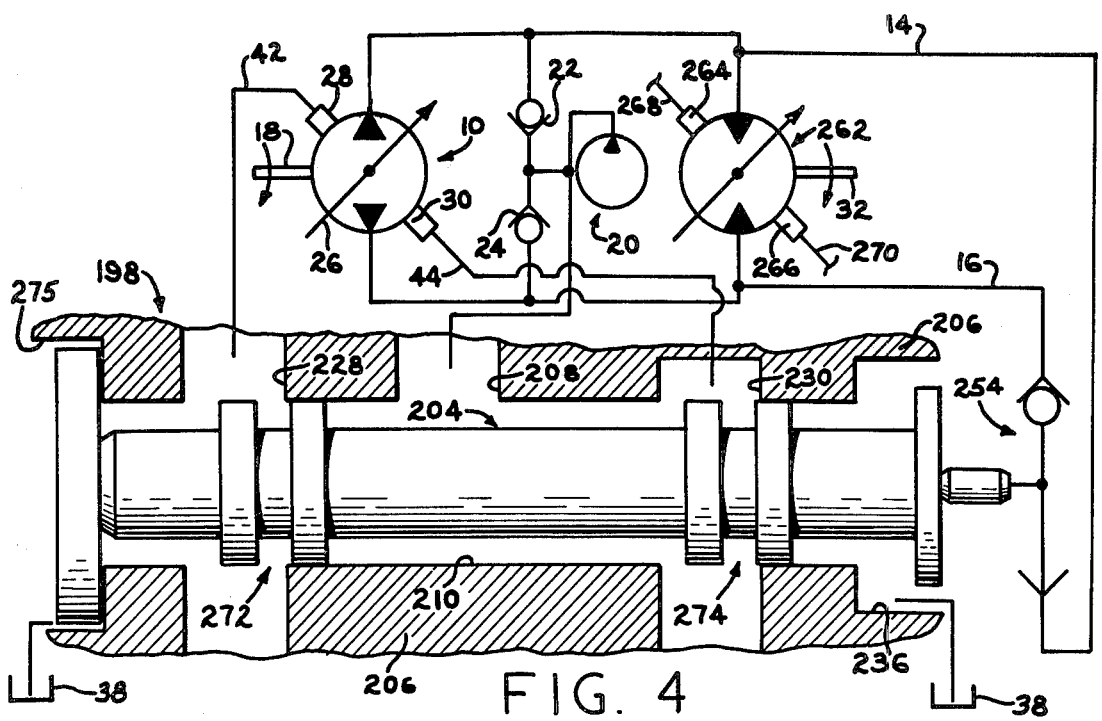
FIGS. 4 and 4A are enlarged views of the spool portion of FIG. 3, schematically illustrating the electro-hydraulic control connected within a hydrostatic transmission circuit, controlling pump displacement and morot displacement, respectively.

FIGS. 7 through 18 schematically illustrate various components of the electro-hydraulic control assembled in a manner to control either the variable displacement pump or motor of the circuit of FIG. 4.

Figure 1:
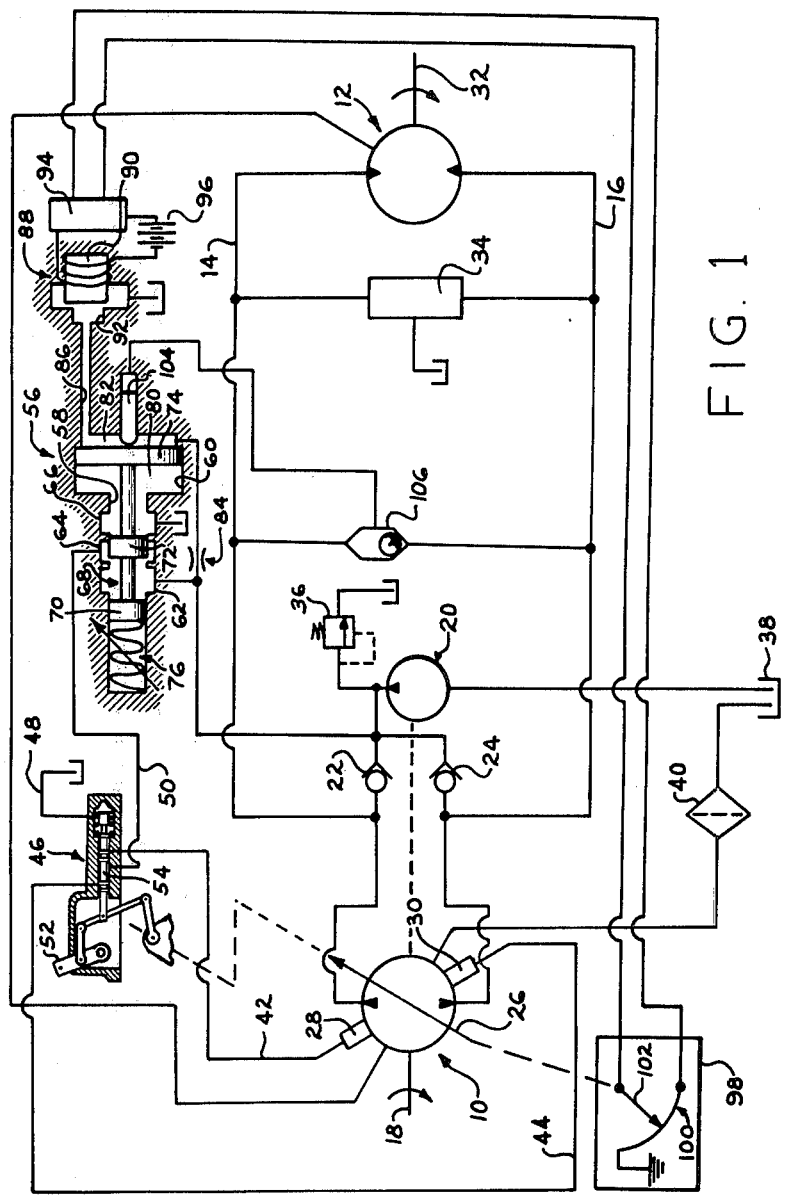
FIG. 1 illustrates a hydrostatic transmission incorporating an electro-hydraulic control according to a feature of the invention.

The hydrostatic transmission of FIG. 1 includes a variable displacement swashplate axial piston pump 10 hydraulically coupled to a fixed displacement motor 12 via conduits 14 and 16. Pump 10 is a well known type and includes an input shaft 18 which is used to drive the rotating group of the pump and also drive a charge pump 20 hydraulically coupled via check valves 22 and 24 respectively to conduits 14 and 16. Pump 10 further includes a swashplate 26 which is movable cross center by a pair of known piston-cylinder servos 28 and 30. Motor 12 includes an output shaft 32. Hydraulically coupled in parallel with motor 12 is a known control mechanism 34 which includes a shuttle valve, a high pressure relief valve and a charge pressure relief valve. A charge pump relief valve 36 is hydraulically coupled to the output of charge pump 20. Pump 10, motor 12, and charge pump 20 are all in hydraulic communication with reservoir 38. A filter 40 is provided in the drain conduit from pump 10 and motor 12 to reservoir 38.

Servos 28 and 30 are hydraulically coupled via conduits 42 and 44 to a manual servo control valve 46. Conduit 48 communicates the spring chamber of control valve 46 with the reservoir. Another conduit 50 communicates the bore of control valve 46 with the charge pump as is well known in the art. Control valve 46 includes a control lever 52 and linkage connecting the control valve spool 54 with swashplate 26 to center spool 54 when the position of the swashplate matches the desired position set by control lever 52.

All of the preceding elements are well known in the art of hydrostatic transmission controls. Accordingly, a further description of the operation of these elements does not appear to be warranted. The remaining portion of the specification will therefore be directed toward a description of the electro-hydraulic control 56 and its operation with the previously described portions of the hydrostatic transmission.

Electro-hydraulic control 56 includes a housing defining a first bore 58 and a second bore 60. A plurality of axially spaced annular grooves 62, 64, and 66 are provided in first bore 58 and respectively are in fluid communication with the charge pump 20, servo control valve 46, and reservoir 38.

A spool 68 is located within bores 58 and 60 and includes a pair of axially spaced lands 70 and 72 in bore 58 and another land 74 in bore 60. An adjustable spring 76 resiliently biases spool 68 to the right in FIG. 1 to the stop position illustrated thereby opening communication between annular grooves 62 and 64.

A pair of chambers 80 and 82 are defined on opposite sides of land 74 with bore 60. Chamber 80 is always in fluid communication with reservoir 38 while chamber 82 is in fluid communication with charge pump 20 via an orifice 84 and with reservoir 38 via a conduit 86 and a variable force valve 88.

Valve 88 includes a spool 90 upon which a variable force is exerted. Progressive movement of spool 90 to the left in FIG. 1 results in the progressive closing of opening 92 thus creating a variable orifice. Accordingly, progressive movement of spool 90 to the right in FIG. 1 progressively opens opening 92. The left-ward force exerted on spool 90 is directly related to the amount of electrical current flowing from an electrical control 94.

Electrical control 94 is coupled to a power source 96 and in the illustrated embodiment to a swashplate position indicator 98. The swashplate position indicator includes a rheostat 100 and a pointer 102. Accordingly, an electrical signal indicative of swashplate position is provided via swashplate position indicator 98 to electrical control 94. As is well known, the position of swashplate 26 of pump 10 is directly related to the displacement of pump 10 and accordingly the volume of fluid flowing from pump 10 to motor 12 at a given speed of input shaft 18.

Electro-hydraulic control 56 further includes a roller needle 104 having one end in contact with land 74 and the other end hydraulically coupled via a shuttle valve 106 to the high pressure conduit 14 or 16. Accordingly, the leftward force exerted by roller needle 104 on spool 68 will be directly proportional to the highest pressure within conduits 14 and 16. This pressure in most instances will be the pressure of the fluid flowing from pump 10 to motor 12 to drive output shaft 32.

The electro-hydraulic control 56 is illustrated as being connected as an input torque limiter for the hydrostatic transmission. As will be hereinafter described it may be used in a number of other ways to control the operation of the hydrostatic transmission simply by providing different electrical controls 94 having different inputs.

As described electro-hydraulic control 56 operates in the following manner. It is well known in the hydraulic art that system pressure times displacement (volume of hydraulic fluid) is directly related to the torque of the hydraulic system. Therefore by maintaining the multiple of system pressure times displacement constant one can provide torque limiting means for the system and thereby match the maximum torque of the hydraulic system with the maximum torque provided by the prime mover used to drive input shaft 18. As illustrated, the displacement of pump 10 is provided via swashplate position indicator 98 to electrical control 94. The system pressure is provided via shuttle valve 106 to needle roller 104. As the system pressure acting on the needle roller increases and overcomes the force of spring 76, the pressure of the fluid ported from charge pump 20 to servo control valve 46 is reduced. This occurs by movement of land 72 to a position in which annular grooves 64 and 66 are placed in communication with one another. As the pressure to servo control valve 46 is reduced the centering moment of pump 10 and the springs within servos 28 and 30 act to decrease the displacement of the pump to that required to maintain the said system pressure. As the displacement is decreasing, however, an electrical signal is being fed via swashplate position indicator 98 to electrical control 94. This results is a decrease in leftward force on spool 90 thereby reducing the pressure of the fluid in chamber 82 and accordingly allowing spool 68 to move back to the right in FIG. 1 and port fluid from charge pump 20 to servo control valve 46.

Similarly, as system pressure is decreased, spool 68 will move to the right in FIG. 1 increasing the pressure of the fluid from charge pump 20 to control valve 46 and accordingly the displacement of pump 10. However, as this is occurring, swashplate position indicator 98 will feed an electrical signal to electrical control 94 which will result in an increase in righward force on spool 90 moving the spool toward opening 92 and thereby increasing the pressure in chamber 82. This increase in pressure will result in spool 68 moving to the left in FIG. 1 and returning to the desired position.

In operation, charge pump relief valve 36 is set to maintain a maximum charge pump pressure of about 200 psi. Variable force valve 88 is provided to maintain the pressure of the fluid within chamber 82 linearly from 10 psi to 150 psi depending upon the signal from electrical control 94. The high pressure relief valve in control mechanism 34 will generally be set in the area of 3500 psi to 6000 psi. Appropriate modification to the area of land 74 subject to fluid pressure in chamber 82 and the area of roller needle 104 subject to system pressure can be made by those skilled in the art. The design of the electronic circuit used in electrical control 94 is also well known to those skilled in the art of electrical controls.

Figure 2:
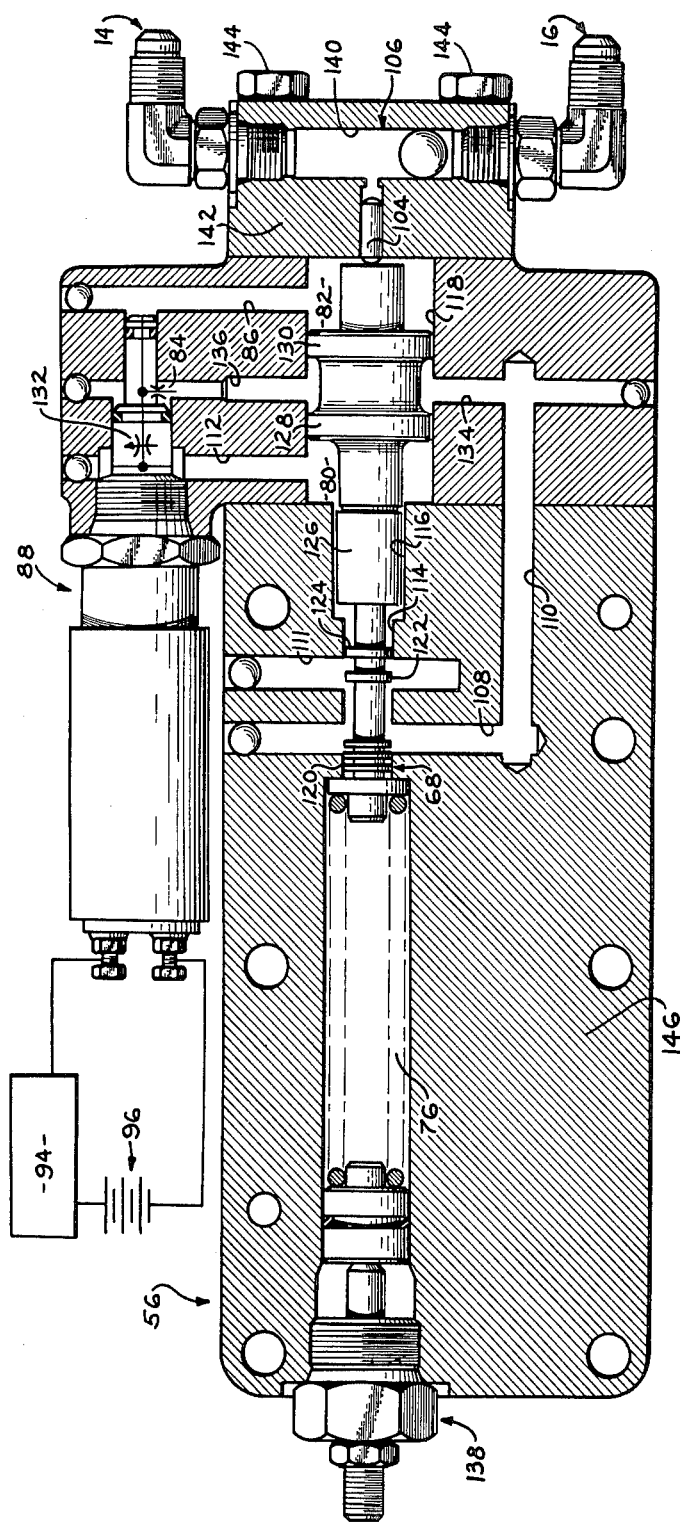
FIG. 2 is a cross sectional view partly in schematic of the electro-hydraulic control illustrated in FIG. 1.

Referring now to FIG. 2 which illustrates a specific embodiment of an electro-hydraulic control according to the invention, charge pump 20 ports fluid to control 56 via passages 108 and 110. Passage 111 is in fluid communication with servo control valve 46 via conduit 50. A passage 112 fluidly communicates chamber 80 with reservoir 38.

Spool 68 is located in a multi-stepped bore 114, 116, and 118 and includes lands 120, 122, 124, 126, 128, and 130. Land 120 prevents fluid from flowing from bore 114 to the chamber housing adjustable spring 76. Land 122 or 124 contacts the wall of bore 114 depending upon the position of spool 68. Land 126 is spaced from the walls of bore 116 to allow fluid to flow from passage 111 through bore 114, bore 116 into chamber 80 and then through conduit 112 to the reservoir. Lands 128 and 130 are in contact with the wall of bore 118.

Variable force valve 88 is illustrated as a standard proportional pressure controller valve Model 80 provided by Fema Corporation, Portage, Michigan. The variable orifice defined by spool 90 and opening 92 in FIG. 1 is illustrated schematically in valve 88 by variable orifice 132. Orifice 132 as well as orifice 84 are component parts of the Fema valve. Passages 134 and 136 in control 56 are provided to direct fluid from passage 110 to orifice 84 via bore 118 and from there either to passage 86 or 112 depending upon the degree that variable orifice 132 is opened.

Adjustable spring 76 includes an adjustable stop 138 which may be screwed into or out of control 56. The position of adjustable stop 138 will control the rightward force exerted by spring 76 on spool 68.

Briefly, in operation, the pressure of the fluid in chambers 82 and 140 of shuttle valve 106 will respectively be exerted against the areas of land 130 and needle roller 104 to bias spool 68 to the left in FIG. 2 against the force of spring 76. As spool 68 is moved to the left, the fluid flowing from charge pump 20 through passage 108 around land 122 to passage 111 and from there to servo control valve 46 is slowing restricted until a point is reached when land 122 makes contact with the wall of bore 114 to terminate such flow. At this point, land 124 begins to move away from the wall of bore 114 allowing fluid communication between passage 111 and bore 116 to drain fluid from passage 111 into the reservoir. It may therefore readily be seen that the fluid pressure directed through passage 111 from charge pump 20 is directly dependent upon the position of spool 68 in control 56. The position of spool 68 is directly related to the force exerted by spring 76 and the force exerted by the pressure of fluid in chamber 82 against the area of land 130 and the force exerted by the pressure of fluid in chamber 140 against the area of needle roller 104.

Shuttle valve 106 may comprise a separate housing 142 which may be secured by bolts 144 to housing 146 of control 56. If desired, shuttle valve 106 may be removed and a flat plate may be bolted on housing 146 in its place. In this latter arrangement, the pressure of the fluid in chamber 82 and the force of spring 76 would be the only two factors used to position spool 68 within valve 56.

Various electrical controls can also be designed to operate variable force valve 88 and, accordingly, control the pressure of the fluid within chamber 82. These controls can have inputs from the position of the swashplates of a variable displacement pump and/or a variable displacement motor. Further, the pressure of the fluid in chamber 82 may be directly dependent upon system pressure by sealing passage 110 and removing needle roller 104 in the valve illustrated in FIG. 2. Electrical controls may also be operated by inputs from a prime mover rotating input shaft 18 of pump 10 and the position of swashplate 26 to prevent the prime mover from stalling during overload conditions. Other variations in the electrical controls are also contemplated.

By the foregoing, applicant has developed a single hydraulic control whose basic components may be readily changed to perform a number of control functions. It is to this hydraulic control that the following claims are directed. It should be appreciated that the orifice 132 may be varied in other ways, e.g., mechanically or hydraulically. Further, the fluid chamber 82 may be in communication with the spring end of spool 68 and be used to exert a force against the force exerted by needle roller 104. Also the operation of orifices 132 and 84 may be interchanged in FIG. 2 thereby making orifice 83 a variable orifice controlled by variable force valve 88 and orifice 132 a fixed orifice. Still further, instead of using a variable force valve 88 it would be possible to use an on/off valve such as Model 103 BS-12VDC, 2-way, NC Cartridge sold by Fluid Power Systems, Division of AMBAC Industries. In FIG. 2, the on/off valve would either fully open or fully close the restriction defined by passage 132. By cycling the on/off valve, the pressure could be controlled in chamber 82 to perform substantially the same function that is performed by variable force valve 88. Again, the operation of orifices 132 and 84 could be interchanged to make orifice 132 a fixed orifice and to make orifice 84 either fully open, fully closed, or cycled depending upon the operation of the on/off valve.

Figure 3:
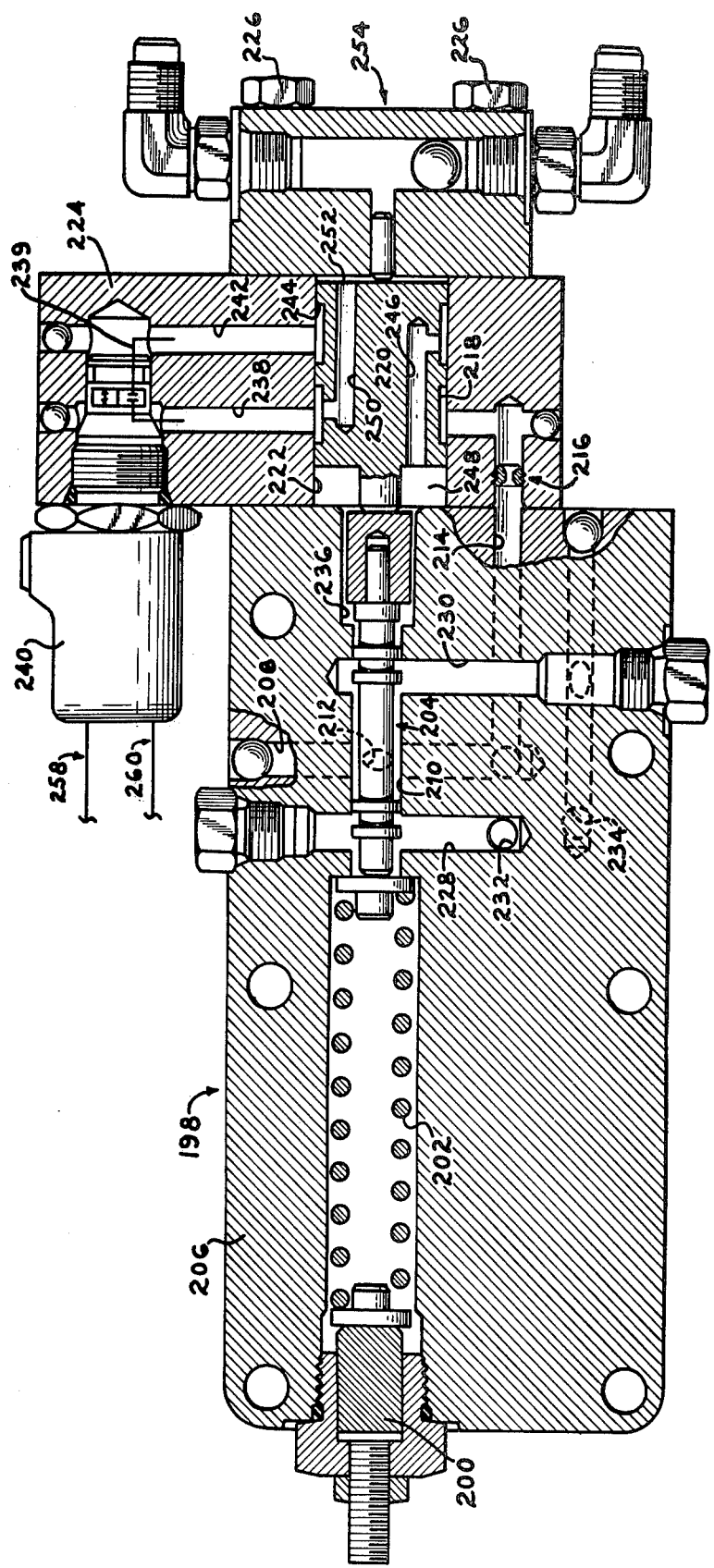
FIG. 3 is a cross sectional view similar to FIG. 2 but illustrating another embodiment of the electro-hydraulic control.

FIG. 3 illustrates an arrangement similar to that described in the preceding paragraph which can be used in place of valve 46 and control 56 in FIG. 1. The electrohydraulic control 198 of FIG. 3 includes an adjustable stop 200 which varies the force exerted by spring 202 on spool 204. Control 198 includes a housing 206 having an inlet port 208 which would be fed by charge pump 20 in FIG. 1. Inlet port 208 communicates with a bore 210 in which spool 204 is located via a passage 212 at right angles to port 208 in FIG. 3. Port 208 further communicates via a passage 214 and an orifice 216 with an annular groove 218 in a spool 220. Spool 220 is located within a bore 222 in a housing 224 which is secured to housing 206 by bolts 226. Ports 228 and 230 in housing 206 would be respectively connected to piston-cylinder servos 28 and 30 (FIG. 1) via openings 232 and 234. Ports 228 and 230 further communicate with bore 210 at spaced location on opposite sides of passage 212. An enlarged portion 236 of bore 210 would communicate with drain 38 in FIG. 1. The exact connection as described can best be seen in FIG. 4 of the drawings.

Housing 224 further includes a passage 238 communicating with a passage 239 in an on/off valve 240 such as the one previously described and made by Fluid Power Systems. Passage 242 in housing 224 interconnects passage 239 with an annular groove 244 and 220. Annular groove 244 is in communication, via passage 246 in spool 220, with bore 222 and, accordingly, bore 236 and drain 38. Bore 222 defines a chamber 248 at one end of spool 220. Annular groove 218 in spool 220 is in communication, via passage 250 in spool 220, with a chamber 252 at the other end of spool 220. Chambers 248 and 252 in FIG. 3 function in the same manner as that described for chambers 80 and 82 in FIG. 2.

A shuttle valve 254 similar to 106 in FIG. 2 is secured by bolts 226 to housings 206 and 224. The function of shuttle valve 254 is identical to that of shuttle valve 106 in FIG. 2

Passage 239 of valve 240 is schematically illustrated in FIG. 3. Valve 240 is used to either fully open or fully close passage 239 in response to an electrical input fed via lines 258 and 260. By opening and closing passage 239, the pressure in chamber 252 may be controlled to vary the position of spool 204 in a manner similar to that described for control 56 of FIG. 2. Inputs to valve 240 may be of a relatively high frequency, e.g., 60 cycles per second and controlled by an appropriate electrical circuit responding to controlled inputs similar to those fed to electric control 94 in FIG. 2. In this manner, on/off valve 240 can act as a variable force valve 88. It should be appreciated that housing portion 224 in FIG. 3 may be substituted for the corresponding portion illustrated in FIG. 2. Also, the proper design of housing 224, variable force valve 88 can be substituted for on/off valve 240. Further, shuttle valve 254 can be removed and replaced by a flat plate as described in FIG. 2.

Figure 5:
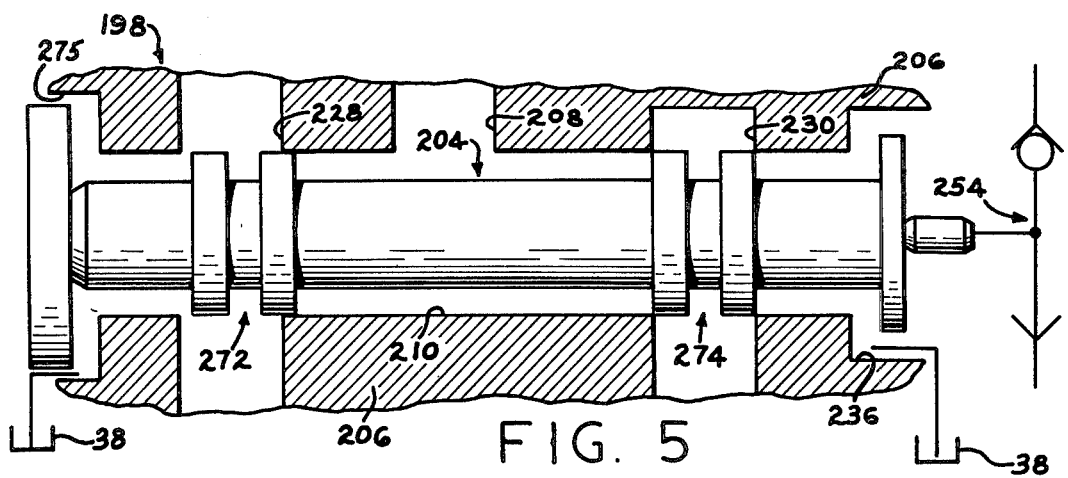
FIGS. 5 and 6 are views of the spool of FIG. 4 illustrating the spool being displaced from the FIG. 4 position.
Figure 6:
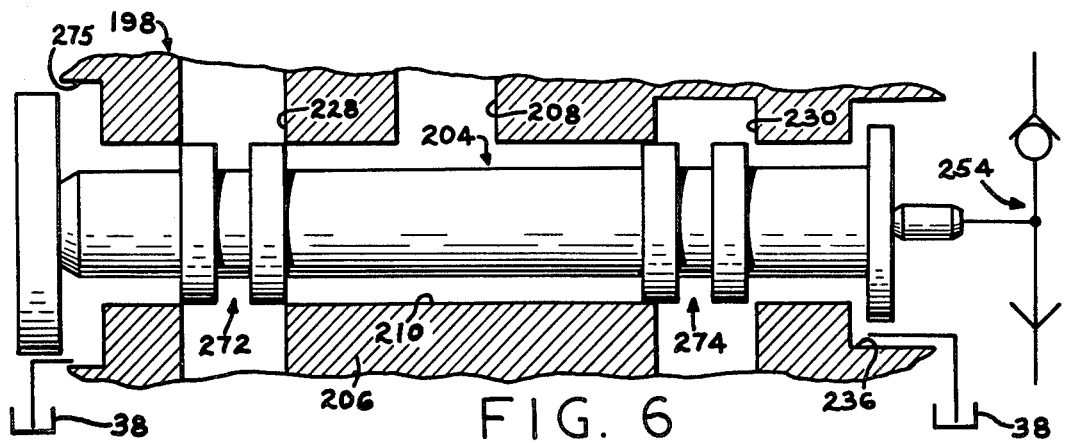

The advantages of the arrangement of FIG. 3 over that shown in FIG. 2 is best illustrated with reference to FIGS. 4 through 6. Some of these advantages exist mainly in the design and construction of housing 206 and spool 204. A number of items shown in FIG. 4 are identical to those shown in FIG. 1. Identical items are indicated by the same number. Motor 12 in FIG. 1 is illustrated in FIG. 4 as a variable displacement motor 262 controlled by piston-cylinder servos 264 and 266 in a known manner. Conduits 268 and 270 are respectively used to direct fluid to servos 264 and 266. For simplicity, parts of control 198 are schematically illustrated in FIGS. 4 through 6. Spool 204 includes a pair of axially spaced lands 272 and 274. The spacing of lands 272 and 274 and the positioning of ports 208, 228, and 230 within bore 210 is designed to first provide a flow of fluid from port 208 via bore 210 to port 230 via conduit 44 to servo 30 while porting servo 28 via conduit 42 to port 228 and to drain 38 via bore 210 and the chamber 275 that houses spring 202. As spool 204 is moved to the left in FIGS. 4 through 6, land 274 first closes communication between port 230 and port 208 as illustrated in FIG. 5 and then opens communication between port 230 and drain 38 via bores 210 and 236. Further movement of the spool 204 to the left in FIG. 5 results in closing communication between port 228 and drain 38 as illustrated in FIG. 6. As spool 204 continues to move to the left in FIG. 6, port 228 communicates with port 208 via bore 210 and is sealed from drain 38. At the same time, port 230 is in communication with drain 38 via bores 210 and 236.

Spool 204 is designed to either meter on land 274 or meter on land 272. In this way, high pressure fluid can either be directed toward servo 30 or servo 28 to vary the displacement of pump 10. With the arrangement of FIGS. 3 to 6, the control valve 46 of FIG. 1 can be eliminated. Control 198 may also be used to control the displacement of motor 262 by porting fluid to servos 264 and 266, as will be described subsequently.

Control 198 can also be used in place of control 56 with valve 46 in the circuit illustrated in FIG. 1. Port 230 would correspond to passage 111 while port 208 would correspond to passage 108. Since land 274 meters before port 228 is open to port 208, the spool 204 would operate in the same manner as the spool 68 in FIG. 2. A plug would be located in opening 232 to seal port 228 from the atmosphere.

Variable force valve 88 may be readily interposed for on/off valve 240 in housing 224. It should be noted that in the arrangement of FIG. 3, orifice 216 takes the place of orifice 84 in FIG. 2. Passage 136 and 86 would correspond to passage 238 of FIG. 3 while passage 242 of FIG. 3 would correspond with passage 112 of FIG. 2. It should be noted that the orifice 132 of valve 88 in FIG. 2 would be interposed between passages 238 and 242 in FIG. 3. This would be readily accomplished by proper design. Accordingly, by varying the orifice 132, the pressure in chamber 252 can be varied by porting fluid via passages 238,242, groove 244, passage 246, chamber 248 to drain. Such design capabilities are within the knowledge of those skilled in the art.

Valve 240 can also be used to control the operation of spool 204 by either opening passage 238 between passages 238 and 242 or closing passage 239. In this way, spool 204 would be used to either direct fluid from port 208 to port 230 when the pressure of the fluid in chamber 252 is relatively low or to direct fluid from port 208 to port 228 when the pressure of the fluid in chamber 252 is relatively high. Valve 240 may be either on, i.e., passage 239 open between passages 238 and 242, or off, i.e., passage 239 closed between passage 238 and passage 242, when no electrical signal is directed to valve 240. In this mode, lines 258 and 260 could be readily connected to a power source 96 such as illustrated in FIG. 2 and a known electrical on/off switch.

Figure 4A:
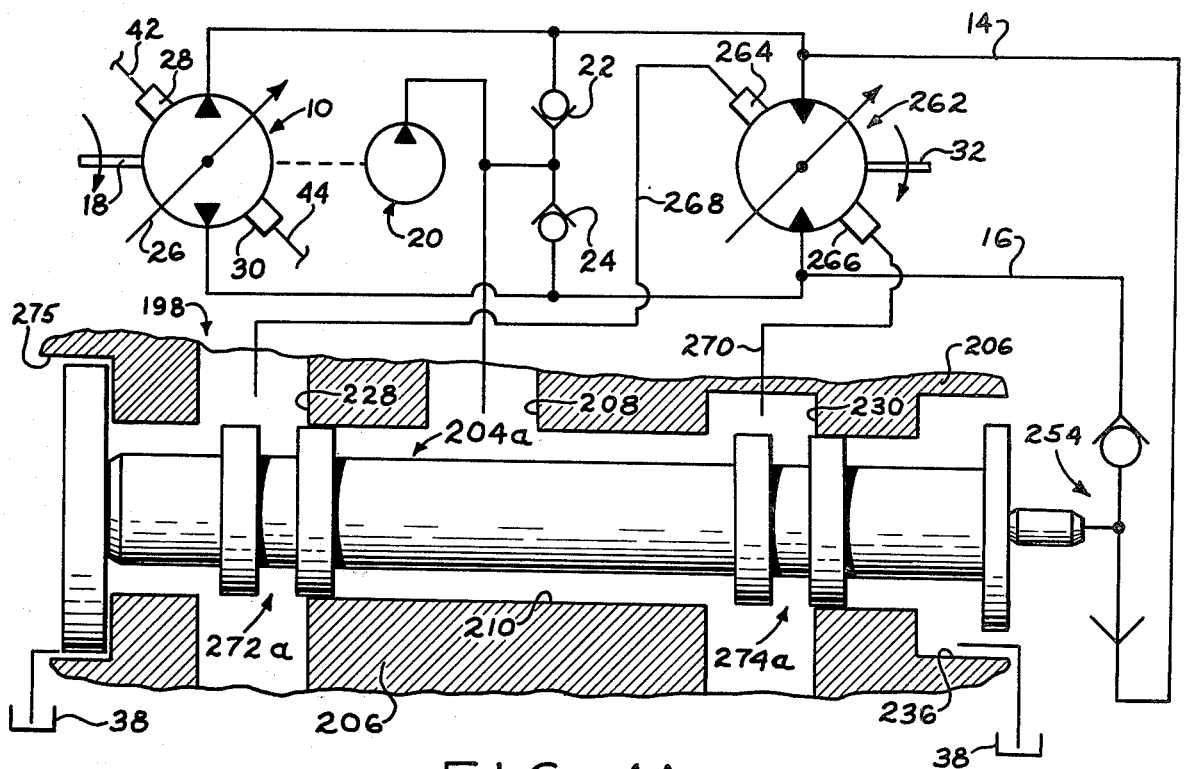
Figure 5A:
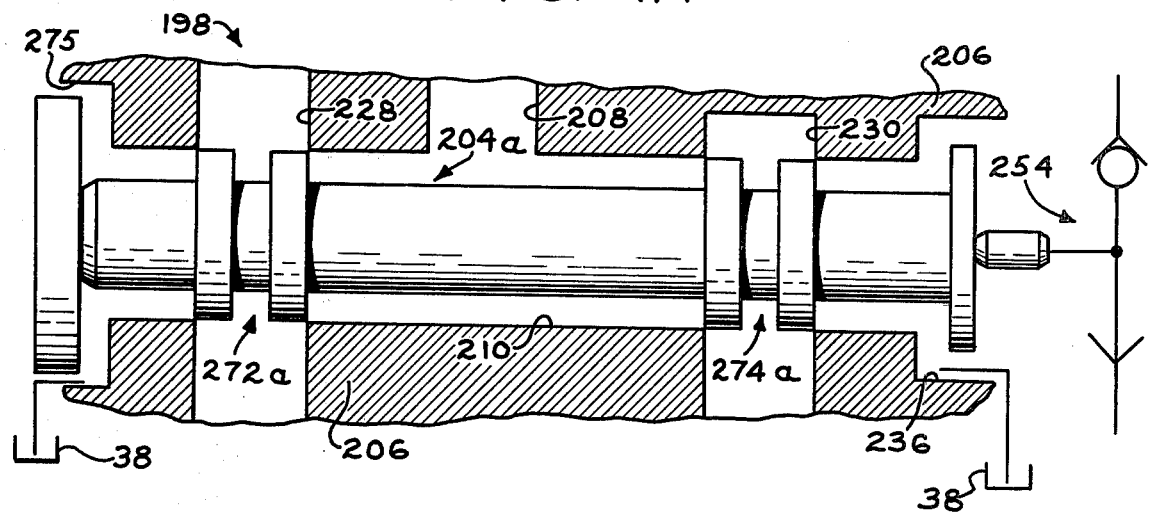
FIG. 5A is a view of the spool of FIG. 4A, illustrating the spool being displaced from the FIG. 4A position.

In the FIG. 4 embodiment, the control 198 is shown controlling the flow of fluid to the servos 28 and 30, to vary the displacement of the variable pump 10. However, as mentioned previously, the control 198 can also be used to control the displacement of a variable motor. Referring now to FIGS. 4A and 5A, there is illustrated such a system with like elements bearing like numerals and modified elements bearing like numerals, followed by the letter "a".

In the system of FIG. 4A, the variable displacement pump unit 10 may have fluid flow to and from its servos 28 and 30 controlled by one of the controls 56 or 198 described hereinabove, or directly by a manual control valve, such as the valve 46 in FIG. 1, or by any other known, suitable pump displacement control. The conduits 268 and 270, communicating with the servos 264 and 266, respectively, are connected to the ports 228 and 230, respectively. In the preferred form of FIG. 4A, and with the spool 204a in the position shown, charge fluid flows from port 208, past land 274a, through port 230 and conduit 270 to the servo 266, to drive the swashplate of the motor 262 toward minimum displacement.

If the spool 204a is displaced to its extreme leftward position, charge fluid flows from port 208, past land 272a, through port 228 and conduit 268 to the servo 264, to drive the swashplate of the motor 262 toward maximum diaplacement. Thus, the versatility of the control 198 may be seen from its ability to control pump displacement between maximum in one direction and maximum in the opposite direction, or to control motor displacement between maximum and minimum displacement.

A particular advantage of the control 198, when used to control a variable displacement motor, is the ability to obtain maximum motor displacement, either automatically or manually, under appropriate conditions. Normally, the inputs to the valve 240 are such that the passage 239 is fully open, chamber 252 is at reservoir pressure, and the control 198 acts in the manner of a conventional motor pressure responsive valve to decrease motor speed and increase torque in response to increases in system pressure, as sensed by the shuttle valve 254. Under certain conditions, such as the working mode of a heavy construction vehicle, it is desirable to maintain maximum motor displacement under varying load conditions. During such an operating mode, the inputs to the valve 240 may be manually changed by the operator to fully close the passage 239 and put chamber 252 at substantially charge pressure, thus biasing the spool 204a to its extreme leftward position (in FIG. 4A), regardless of the instantaneous system pressure. Thus, the flow of charge fluid is as described previously, and the motor 262 is kept at maximum displacement, in effect, "deactivating" the normal pressure responsive control.

As a further example of the above-described use of control 198, whenever a vehicle is operating in reverse, the inputs to the valve 240 may be automatically changed to close the passage 239, and keep the vehicle in the low speed range, for purposes of safe operation.

In the FIG. 4 embodiment of the control 198, the spacing of the lands 272 and 274 relative to the spacing of the ports 228 and 230 is such that when the land 274 and port 230 are "line-to-line" (FIG. 5), the land 272 blocks communication from the port 208 to port 228 while permitting communication from port 228 to tank 38. It should be understood, however, that control 198 of the present invention is not limited to such a land-port relation. By way of example, the embodiment of control 198 shown in FIGS. 4A and 5A includes a land-port relation wherein the land 272a and port 228 and the land 274a and port 228 are "line-to-line" simultaneously (FIG. 5A), such that each of the lands is metering fluid to and from its respective port at the same time. It should also be understood that in regard to the scope of the present invention, the type of land-port relation is conceptually unrelated to whether the control is being used to control a pump or a motor.

The given spool-bore port arrangement illustrated in FIGS. 3 through 6 provides for either powering a variable displacement unit into displacement or powering it back to neutral. It may be used either with a variable displacement pump or motor, with or without a shuttle valve, and with or without a variable force valve 88 or an on/off valve 240. If desired, the housing 224 in FIG. 3 can be completely eliminated and the shuttle valve 254 may be bolted directly to housing 206 to make a pressure compensating valve. With the foregoing components in mind, FIGS. 7 through 18 illustrate a variety of controls that may be simply and inexpensively constructed from the components: 206, 240, and 254 in FIG. 3; the component 88 of FIG. 2; and a component 224 modified as previously suggested to receive either component 88 or 240. Other variations are also possible.

Figure 7:
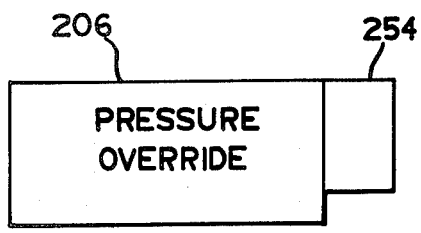
Figure 8:
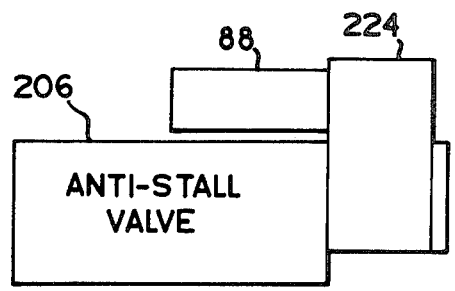
Figure 9:
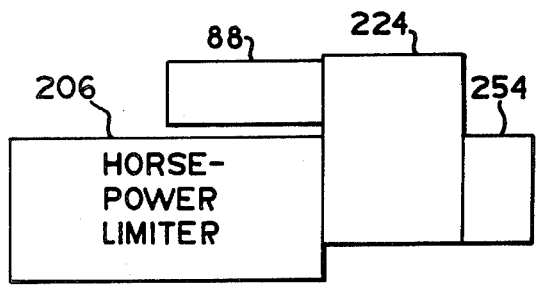
Figure 10:
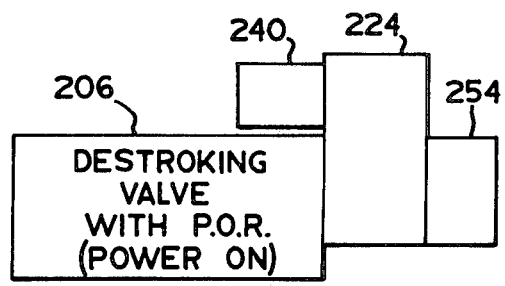
Figure 11:
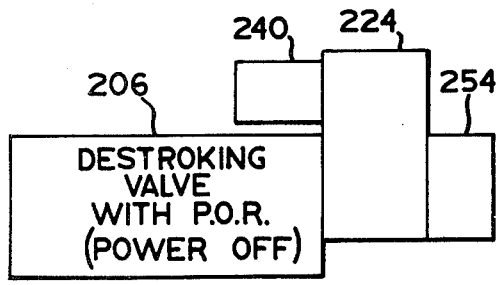
Figure 12:
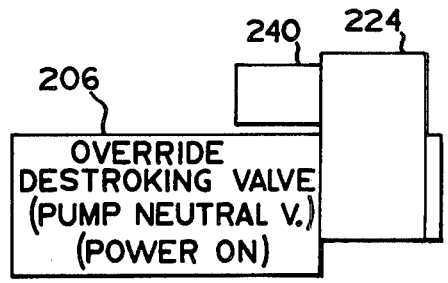
Figure 13:
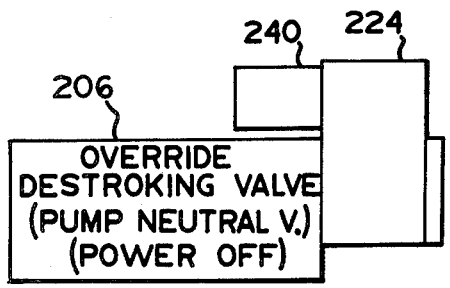
Figure 14:
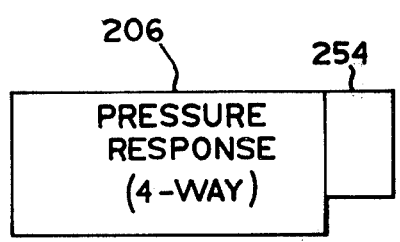
Figure 15:
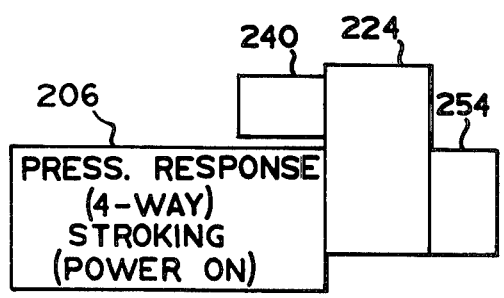
Figure 16:
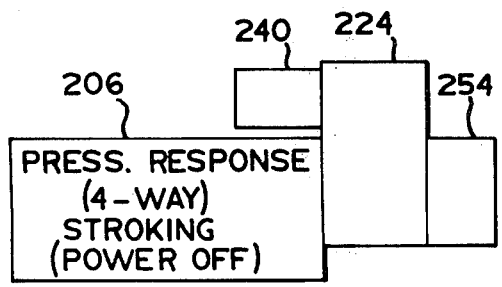
Figure 17:
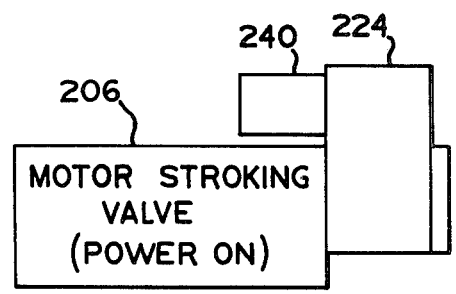
Figure 18:
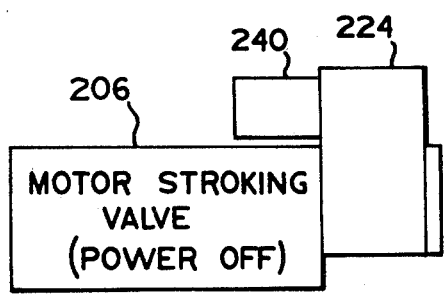

Briefly, the controls illustrated in FIGS. 7 through 18 operate in the following manner. In FIG. 7, shuttle valve 254 would be connected across lines 14 and 16 and housing 210 would be interposed between charge pump 20 and valve 46 as illustrated in FIG. 1. As the pressure in line 14 or 16 exceeds a predetermined value, valve 46 would be ported to drain thereby deswashing pump 10. In FIG. 8, shuttle valve 254 is replaced by a flat plate. An appropriate electrical signal is fed into variable force valve 88 to control the flow of fluid in the circuit of FIG. 1 from the charge pump 20 to valve 46 to drain. The input signal to valve 88 is controlled by inputs from the rotational speed of input shaft 18, the given throttle setting of a prime mover driving shaft 18, and the desired throttle setting. Therefore, as the speed of the prime mover decreases, valve 88 increases the pressure in, for example, chamber 252 in FIG. 3 to port fluid from valve 46 to drain and thereby deswash pump 10. The FIG. 9 arrangement has already been described with reference to the embodiments of FIGS. 1 and 2. The FIG. 10 arrangement is a pressure override acting in a manner similar to that of FIG. 7 when electrical power is fed to on/off valve 240. When the power is cut from on/off valve 240, pressure is built up in, for example, chamber 252 in FIG. 3 thereby porting valve 46 to drain. The control of FIG. 11 is similar to that of FIG. 10 with the exception that pump destrokes when power is fed to valve 240. The controls of FIGS. 12 and 13 are similar to those illustrated with reference to the embodiments of FIGS. 3 through 6 with the exception that shuttle valve 254 has been deleted. In the FIG. 12 control, the pump is driven back to neutral directly by the control when no electrical signal is fed to valve 240 where in the FIG. 13 control, the pump 10 is driven back to neutral when an electrical signal is fed to valve 240. The control of FIG. 14 makes use of the spool arrangement of FIGS. 3 through 6 and is, accordingly, connected directly to the variable displacement pump as illustrated in FIG. 4. The movement of spool 204 is solely controlled by the pressure of the fluid in line 14 or 16. The controls of FIGS. 15 and 16 further add an on/off control feature to the control FIG. 14 making the spool 204 respond not only to the pressure of fluid in line 14 or 16 but also to the pressure of fluid in, for example, chamber 252 in FIG. 3 depending upon whether the passage 239 is open or closed. In the FIG. 15 control, passage 239 will be open when power is fed to valve 240 and in the FIG. 16 control, the passage 239 will be open when power is not fed to valve 240. The controls of FIGS. 17 and 18 eliminate the shuttle valve 254 of the FIGS. 15 and 16 controls but continue to make use of the on/off valve 240 and related housing 224. In these latter two controls, the ports of the controls of FIGS. 3 through 6 may be connected to the servos 266 and 264 of motor 262 in FIG. 4 to vary the displacement of the motor in response to electrical signals fed to valve 240. In the control of FIG. 17, passage 239 of FIG. 3 is open when electrical power is fed to valve 240 while in the control of FIG. 17, passage 239 is open when no electrical power is fed to valve 240. As previously noted, many of the controls of FIGS. 7 through 18 may be used to control either the pump or the motor in response to given inputs. Further variation of these controls, in view of the above examples, will also be known to those skilled in the art depending upon the given electrical signals fed to valves 88 and 240.

I claim:

1. A control for use with a variable hydraulic pump unit or motor unit having fluid operable means for varying the displacement of said unit, a source of fluid under pressure, and a drain, said control comprising:
   (a) a housing defining a bore;
   (b) a first port in said housing communicating with said bore and adapted for fluid communication with said fluid operable means;
   (c) a second port in said housing communicating with said bore and adapted for fluid communication with said source of fluid;
   (d) a third port in said housing communicating with said bore and adapted for fluid communication with said drain;
   (e) a fourth port in said housing communicating with said bore and adapted for fluid communication with said fluid operable means;
   (f) valve means in said bore for selectively communicating said ports with one another, said valve means having a first position communicating said first port solely with said second port and said third port solely with said fourth port, a second position communicating said first and fourth ports solely with said third port, and a third position communicating said fourth port solely with said second port and said first port solely with said third port, said valve means is moved through said positions from said first to said second to said third to said second to said first;
   (g) first biasing means to bias said valve means toward said first position;
   (h) second biasing means to bias said valve means toward said third position, said second biasing means including:
      (i) a fluid chamber,
      (ii) inlet conduit means adapted to communicate a source of fluid under pressure with said fluid chamber,
      (iii) means responsive to the pressure of fluid within said fluid chamber to bias said valve means toward said third position, and
      (iv) means responsive to a signal to vary the pressure of the fluid within said fluid chamber.

2. A control according to claim 1 wherein said second biasing means further includes: inlet fluid flow restriction means in said inlet conduit means to restrict fluid flow therethrough; outlet conduit means for transferring fluid from said fluid chamber to said drain; outlet fluid flow restriction means in said outlet conduit means to restrict fluid flow therethrough; and wherein said means responsive to a signal varies the amount of restriction of one of said fluid flow restriction means to vary said pressure within said fluid chamber.

3. A control according to claim 1 wherein one of said biasing means further includes: an additional fluid chamber; means adapted to communicate a source of fluid under pressure with said additional fluid chamber, and means responsive to the pressure of fluid within said additional fluid chamber to bias said valve means toward one of said first and third positions.

4. A control according to claim 1 further comprising: outlet conduit means in fluid communication with said fluid chamber and adapted for fluid communication with said drain; and wherein said means responsive to a signal varies the amount of fluid flow through one of said conduit means to vary said pressure within said fluid chamber.

5. A control according to claim 4 wherein: said second biasing means further includes a fluid flow electrically responsive on/off valve in fluid communciation with said one conduit means; and said means responsive to a signal either fully opens or fully closes said on/off valve to vary said pressure within said fluid chamber.

6. A control according to claim 4 wherein: said second biasing means further includes a fluid flow electrically responsive variable force valve defining a variable orifice in fluid communication with said one conduit; and said means responsive to a signal varies the force exerted by said variable force valve to vary said pressure within said fluid chamber.

7. A control according to claim 4 wherein: said one conduit means includes a variable orifice; and said means responsive to a signal varies the size of said variable orifice to vary said pressure within said fluid chamber.

8. A control according to claim 7 wherein said other conduit means includes an orifice 9. A control according to claim 7 wherein said source of fluid under pressure communicating with said fluid chamber is said source of fluid communicating with said second port.

10. A control according to claim 1 wherein: said first port has a given width; said fourth port has a given width; said valve means includes an axial spool valve having a pair of spaced lands, one of said lands has a width substantially equal to said width of said first port and the other of said lands has a width substantially equal to the width of said fourth port; said valve means has a plurality of positions between said first and second positions wherein said one land meters at said first port between said second and third ports; and said valve means has a plurality of positions between said second and third positions wherein said other land meters at said fourth port between said second and third ports.

11. A control for use with a variable hydraulic pump unit or motor unit having fluid operable means for varying the displacement of said unit, a source of fluid under pressure, and a drain, said control comprising:
(a) a housing defining a bore;
(b) a first port in said housing communicating with said bore and adapted for fluid communication with said fluid operable means;
(c) a second port in said housing communicating with said bore and adapted for fluid communication with said source of fluid;
(d) a third port in said housing communicating with said bore and adapted for fluid communication with said drain;
(e) a fourth port in said housing communicating with said bore and adapted for fluid communication with said fluid operable means;
(f) valve means in said bore for selectively communicating said ports with each other, said valve means having a first position communicating said first port solely with said second port and said third port solely with said fourth port; a second position in which said first port and said fourth port are at substantially identical fluid pressures; and a third position communicating said fourth port solely with said second port and said first port solely with said third port, said valve means being movable from said first position, through said second position, to said third position, and from said third position, through said second position, to said first position;
(g) first biasing means to bias said valve means toward said first position;
(h) second biasing means to bias said valve means toward said third position, said second biasing means including:
 (i) a fluid chamber,
 (ii) inlet conduit means adapted to communicate a source of fluid under pressure with said fluid chamber,
 (iii) means responsive to the pressure of fluid within said fluid chamber to bias said valve means toward said third position, and
 (iv) means responsive to a signal to vary the pressure of the fluid within said fluid chamber.

12. A control according to claim 11 wherein said second biasing means further includes: inlet fluid flow restriction means in said inlet conduit means to restrict fluid flow therethrough; outlet conduit means for transferring fluid from said fluid chamber to said drain; outlet fluid flow restriction means in said outlet conduit means to restrict fluid flow therethrough; and wherein said means responsive to a signal varies the amount of restriction of one of said fluid flow restriction means to vary said pressure within said fluid chamber.

13. A control according to claim 11 wherein one of said biasing means further includes: an additional fluid chamber; means adapted to communicate a source of fluid under pressure with said additional fluid chamber, and means responsive to the pressure of fluid within said additional fluid chamber to bias said valve means toward one of said first and third positions.

14. A control according to claim 11 further comprising: outlet conduit means in fluid communication with said fluid chamber and adapted for fluid communication with said drain; and wherein said means responsive to a signal varies the amount of fluid flow through one of said conduit means to vary said pressure within said fluid chamber.

15. A control according to claim 14 wherein: said second biasing means further includes a fluid flow electrically responsive on/off valve in fluid communication with said one conduit means; and said means responsive to a signal either fully opens or fully closes said on/off valve to vary said pressure within said fluid chamber.

16. A control according to claim 14 wherein: said second biasing means further includes a fluid flow electrically responsive variable force valve defining a variable orifice in fluid communication with said one conduit; and said means responsive to a signal varies the force exerted by said variable force valve to vary said pressure within said fluid chamber.

17. A control according to claim 14 wherein: said one conduit means includes a variable orifice; and said means responsive to a signal varies the size of said variable orifice to vary said pressure within said fluid chamber.

18. A control according to claim 17 wherein said other conduit means includes an orifice.

19. A control according to claim 17 wherein said source of fluid under pressure communicating with said fluid chamber is said source of fluid communicating with said second port.

20. A control according to claim 11 wherein said valve means includes an axial spool valve having one spool land operable to control fluid flow to and from said first port and another spool land operable to control fluid flow to and from said fourth port; said one and said another spool lands being in line-to-line relationship to said first and fourth ports, respectively, when said valve means is in said second position.

21. A control according to claim 11 wherein the fluid pressures communicated from said first and fourth ports to said fluid operable means are effective to vary the displacement of said unit in opposite directions.

22. A control for use with a variable hydraulic pump unit or motor unit having a relatively high pressure fluid conduit and a relatively low pressure fluid conduit and fluid operable means for varying the displacement of said unit, a source of fluid at a relatively constant pressure irrespective of the displacement of said unit, and a drain, said control comprising:
(a) a housing defining an axially extending bore;
(b) a first port in said housing communicating with said bore and adapted for fluid communication with said fluid operable means;
(c) a second port in said housing communicating with said bore and adapted for fluid communication with said source of fluid;
(d) a third port in said housing communicating with said bore and adapted for fluid communication with said drain;
(e) valve means in said bore for selectively communicating said first port and either said second port or said third port, said valve means having a first axial position communicating said first port with one of said second and third ports and a second axial position communicating said first port with the other of said second and third ports;
(f) spring biasing means to bias said valve means axially toward said first position;
(g) second biasing means to bias said valve means against said spring biasing means axially toward said second position, said second biasing means including:
(i) a fluid chamber,
(ii) inlet conduit means adapted to communicate said source of fluid under pressure with said fluid chamber,
(iii) inlet fluid flow restriction means within said inlet conduit means to restrict fluid flow from said source of fluid to said fluid chamber,
(iv) means responsive to the pressure of fluid within said fluid chamber to bias said valve means toward said second position, and (v) means responsive to a signal to vary the pressure of the fluid within said fluid chamber.

23. A control according to claim 22 wherein said signal is electrical.

24. A control according to claim 22 further comprising: another fluid chamber; means responsive to pressure of fluid within said other fluid chamber to bias said valve means against said spring biasing means axially toward said second position; and conduit means adapted to communicate said relatively high presure fluid conduit with said other fluid chamber.

25. A control according to claim 22 further comprising: outlet conduit means in fluid communication with said fluid chamber and adapted for fluid communication with said drain; outlet fluid flow restriction means within said outlet conduit means to restrict fluid flow from said fluid chamber to said drain; and wherein said means responsive to a signal varies the amount of restriction of one of said flow restriction means in one of said conduit means to vary said pressure within said fluid chamber.

26. A control according to claim 25 wherein: one of said fluid flow restriction means is an electrically responsive on/off valve; and said means responsive to a signal either fully opens or fully closes said on/off valve to vary said pressure within said fluid chamber.

27. A control according to claim 25 wherein: one of said fluid flow restriction means is an electrically responsive variable force valve defining a variable orifice; and said means responsive to a signal varies the force exerted by said variable force valve to vary said pressure within said fluid chamber.

28. A control according to claim 25 wherein the signal is directly related to the displacement of said unit.

29. A control according to claim 22 further comprising:
(j) a fourth port in said housing communicating with said bore and adapted for fluid communication with said fluid operable means; and wherein
(k) said valve means has a third axial position communicating said fourth port solely with said second port and said first port solely with said third port;
(l) said valve means when in said first position communicates said first port solely with said second port and said fourth port solely with said third port;
(m) said valve means when in said second position communicates said first and fourth ports solely with said third port; and
(n) said valve means is movable through said positions from said first to said second to said third to said second to said first.

30. A control for use with a hydrostatic transmission including a hydraulic pump unit, a variable hydraulic motor unit having fluid operable means including first and second fluid pressure chambers for varying the displacement of said motor unit in first and second opposite directions, respectively; a source of fluid under pressure; and a drain, said control comprising:
(a) a housing defining a bore;
(b) a first port in said housing communicating with said bore and adapted for fluid communication with said first fluid pressure chamber;
(c) a second port in said housing communicating with said bore and adapted for fluid communication with said source of fluid;
(d) a third port in said housing communicating with said bore and adapted for fluid communication with said drain;

(e) a fourth port in said housing communicating with said bore and adapted for fluid communication with said second fluid pressure chamber;
(f) valve means in said bore for porviding selective communication among said ports, said valve means having:
  (i) a first position communicating said first port solely with said second port and said third port solely with said fourth port;
  (ii) a second position in which said first port and said fourth port are at substantially identical fluid pressures; and
  (iii) a third position communicating said first port solely with said third port and said fourth port solely with said second port;
  (iv) said valve means being movable from said first position, through said second position, to said third position, and from said third position, through said second position, to said first position;
(g) first biasing means for biasing said valve means toward said first position;
(h) second biasing means for biasing said valve means toward said third position, said second biasing means including:
  (i) a first fluid chamber, means adapted to communicate the output pressure from said pump unit to said first fluid chamber, and means responsive to the pressure within said first fluid chamber to bias said valve means in opposition to said first biasing means; and
  (ii) a second fluid chamber, conduit means adapted to communicate a second source of fluid under pressure with said second fluid chamber, means responsive to the pressure of fluid within said second fluid chamber to bias said valve means in opposition to said first biasing means, and means responsive to a signal to selectively control the pressure within said second fluid chamber between a relatively lower pressure and a relatively higher pressure;
  (j) said valve means being in said third position when said second fluid chamber is at said relatively higher pressure, regardless of the pressure in said first fluid chamber.

31. A control according to claim 30 wherein said first fluid pressure chamber is operated to decrease the displacement of said motor unit, and said second fluid pressure chamber is operable to increase the displacement of said motor unit.

32. A control according to claim 30 wherein said second biasing means includes outlet conduit means communicating between said second fluid chamber and said drain, and outlet fluid flow restriction means in said outlet conduit means to restrict fluid flow therethrough.

33. A control according to claim 32 wherein said means responsive to a signal is operable to selectively control said outlet fluid flow restriction means between a relatively lower restriction and a relatively higher restriction.

34. A control according to claim 33 wherein said outlet fluid flow restriction means comprises a fluid flow electrically responsive on/off valve.

35. A control according to claim 33 wherein said source of fluid under pressure in communication with said second port is said second source of fluid under pressure communicating with said second fluid chamber.

* * * * *